(12) United States Patent
Lin et al.

(10) Patent No.: US 7,656,481 B2
(45) Date of Patent: Feb. 2, 2010

(54) ELECTRODE STRUCTURE AND TRANSFLECTIVE LIQUID CRYSTAL DISPLAY DEVICE USING THE SAME

(75) Inventors: Ching-Huan Lin, Sinying (TW); Chih-Ming Chang, Jhongli (TW); Ching-Yu Tsai, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 572 days.

(21) Appl. No.: 11/473,019

(22) Filed: Jun. 23, 2006

(65) Prior Publication Data

US 2007/0013838 A1    Jan. 18, 2007

(30) Foreign Application Priority Data

Jul. 15, 2005    (TW) ............................... 94124203 A

(51) Int. Cl.
*G02F 1/1335*    (2006.01)
*G02F 1/1343*    (2006.01)

(52) U.S. Cl. ................... 349/114; 349/106; 349/129; 349/138

(58) Field of Classification Search ................ 349/106, 349/108, 109, 113, 114; 345/87, 88
See application file for complete search history.

(56) References Cited

U.S. PATENT DOCUMENTS 7,379,135 B2 *    5/2008    Lin et al. .................... 349/114
2005/0264730 A1 *    12/2005    Kataoka et al. ............ 349/114

FOREIGN PATENT DOCUMENTS

| CN | 1510462 A | 7/2004 |
| CN | 1619402 A | 5/2005 |
| JP | 2004-020610 A | 1/2004 |

* cited by examiner

*Primary Examiner*—Dung Nguyen
*Assistant Examiner*—Tai Duong
(74) *Attorney, Agent, or Firm*—Rabin & Berdo, P.C.

(57) ABSTRACT

An electrode structure for use in a transflective liquid crystal display device having a plurality of pixels is disclosed. Each pixel has a reflective region and a transmissive region. The electrode structure at least comprises a first transparent electrode, a reflective electrode and a second transparent electrode. The first transparent electrode is disposed within the transmissive region, while the reflective electrode and the second transparent electrode formed above the reflective electrode are disposed within the reflective region. The area of the second transparent electrode is smaller than the area of the reflective electrode.

21 Claims, 9 Drawing Sheets

ELECTRODE STRUCTURE AND TRANSFLECTIVE LIQUID CRYSTAL DISPLAY DEVICE USING THE SAME

This application claims the benefit of Taiwan application Serial No. 094124203, filed Jul. 15, 2005, the subject matter of which is incorporated herein by reference.

BACKGROUND OF THE INVENTION

1. Field of the Invention

The invention relates in general to an electrode structure and a transflective liquid crystal display (LCD) device using the same, and more particularly to the electrode structure capable of improving the reflectivity and brightness at the low gray level and lower driving voltage applied to the transflective LCD device.

2. Description of the Related Art

With the increasing demand of the electronic products, such as the personal digital assistants (PDAs), cellular phones, projectors and projector TV with large size, the liquid crystal displays (LCDs) have been researched and developed. Also, the displays having great functions such as quick response, high resolution and especially vivid image have been required by the consumers.

According to the light source from the interior or exterior of the display, liquid crystal displays have three basic mode: transmissive, reflective and transflective. The transmissive LCD is illuminated from behind (i.e. opposite the viewer) using a backlight unit. The transmissive LCD, typically used in laptop personal computers, offers wide color gamut, high contrast and the best performance under lighting conditions varying from complete darkness to an office environment. However, if the transmissive LCD is operated in a very bright outdoor environment, it tends to "wash out" unless it has a high brightness backlight. In reflective LCD, the pixels reflect incident light originating from the ambient environment or from a frontlight. Reflective LCD can offer very low power (especially without a front light). Reflective LCD offers the best performance under lighting conditions typical of office environments and brighter. However, reflective LCD will require a frontlight under a dim lighting condition. Transflective LCD combines characteristics of transmissive and reflective LCDs. The pixels in a transflective display are partially transmitting and partially reflective. Transflective LCD can be used under a wide variety of lighting conditions (from complete darkness to full sunlight). Nowadays, transflective LCD is used in small portable devices such as cellular phones, PDAs, handheld games or other portable instrumentation.

FIG. 1A (related art) is a cross-sectional view of a single pixel of a conventional transflective LCD. The pixel illustrated in FIG. 1A has a uniform gap, and is divided into a transmissive region 1 and a reflective region 2. Also, the conventional transflective LCD includes an upper substrate 3, a lower substrate 5, and a liquid crystal layer 4 filled with numerous LC molecules 16 interposed between the upper substrate 3 and the lower substrate 5. In the reflective region 2, a reflective plate 13 is formed on the lower substrate 5. A transparent electrode 14 is formed above the reflective plate 13, and corresponding to the transmissive region 1 and the reflective region 2. A common electrode (made of the transparent material) 15 is formed on the upper substrate 3. The polarization of the light passing through the liquid crystal layer is modulated by changing the alignment of the liquid crystal molecules that is varying with a voltage applied to the transparent electrode 14 and the common electrode 15.

The light 11 in the transmissive region 1 is generated from the backlight unit 17 under the lower substrate 5, while the light 12 in the reflective region 2 is provided by the ambient environment or from a frontlight. When a voltage is applied to the transparent electrode 14 and the common electrode 15, the arrangement of the LC molecules 16 is varied and the light transmission consequently changes. Thus, the LCD can display images with different brightness such as white, black, and intermediate gray scale. However, the path of the light 12 is different from that of the light 11, and the optical retardation of the light 12 passing through the reflective region 2 is almost twice as that of the light 11 passing through the transmissive region 1. When a voltage is applied to the pixel of the LCD, the transmittance in the transmissive region 1 and the reflectance in the reflective region 2 are not a good match. FIG. 1B (related art) is a graph illustrating the transmittance in the transmissive region and the reflectance in the reflective region when a voltage is applied to the LCD of FIG. 1A. As shown in FIG. 1B, when the transmissive region 1 achieves the brightest condition, the reflective region 2 has already achieved and starts to drop into the dark state. The highest efficiencies of the transmissive region 1 and the reflective region 2 cannot be achieved simultaneously at the same voltage value. Recently, a dual-gap design which uses different cell gaps in the transmissive region 1 and the reflective region 2 has been provided for solving the problem of the optical retardation described above. However, the dual-gap design complicates the process for making the transflective LCD; thus, the production yield is decreased and the production cost is increased.

SUMMARY OF THE INVENTION

It is therefore an object of the present invention to provide an electrode structure and a transflective liquid crystal display (LCD) device using the same, capable of improving the reflectivity and brightness of the transflective LCD device, particularly at the low gray level.

The present invention achieves the objects by providing an electrode structure applied to a transflective LCD device. The transflective LCD device has a plurality of pixels, and each pixel has a reflective region and a transmissive region. The electrode structure at least comprises a first transparent electrode formed within the transmissive region; a reflective electrode formed within the reflective region; and a second transparent electrode formed within the reflective region and above the reflective electrode, wherein an area of the second transparent electrode is smaller than an area of the reflective electrode.

The present invention achieves the objects by providing a transflective liquid crystal display (LCD) device at lease comprising a lower structure, an upper structure and a liquid crystal layer positioned between the lower structure and the upper structure. The lower structure comprises a lower substrate and a plurality of scan lines and data lines. The data lines perpendicular to the scan lines for defining a plurality of pixels, and each pixel electrically controlled by a TFT is defined by two adjacent scan lines and data lines. Each pixel comprises a transmissive region, having a first transparent electrode; and a reflective region, having a reflective electrode and a second transparent electrode. Also, the second transparent electrode is formed above the reflective electrode, and an area of the second transparent electrode is smaller than an area of the reflective electrode. The upper structure comprises an upper substrate and a common electrode, wherein the common electrode is formed on the upper substrate and positioned opposite to the first transparent electrode and the reflective electrode.

Also, the reflective electrode may comprise a first reflective portion and a second reflective portion in the practical application.

Other objects, features, and advantages of the present invention will become apparent from the following detailed description of the preferred but non-limiting embodiment: The following description is made with reference to the accompanying drawings.

DETAILED DESCRIPTION OF THE INVENTION

In the present invention, a transparent electrode is further disposed within the reflective region of the pixel for generating different electric-field intensity in the reflective region. Accordingly, the difference of electric-field intensity causes the different tilt angles of the LC molecules in the reflective region, so as to harmonize the V-R curve and the V-T curve, and particularly to improve the reflectance corresponding to the low gray-level value.

It is noted that several embodiments have been disclosed herein for illustrating the present invention, but not for limiting the scope of the present invention. Additionally, the drawings used for illustrating the embodiments of the present invention only show the major characteristic parts in order to avoid obscuring the present invention. Accordingly, the specification and the drawings are to be regard as an illustrative sense rather than a restrictive sense.

First Embodiment

Figure 1A:
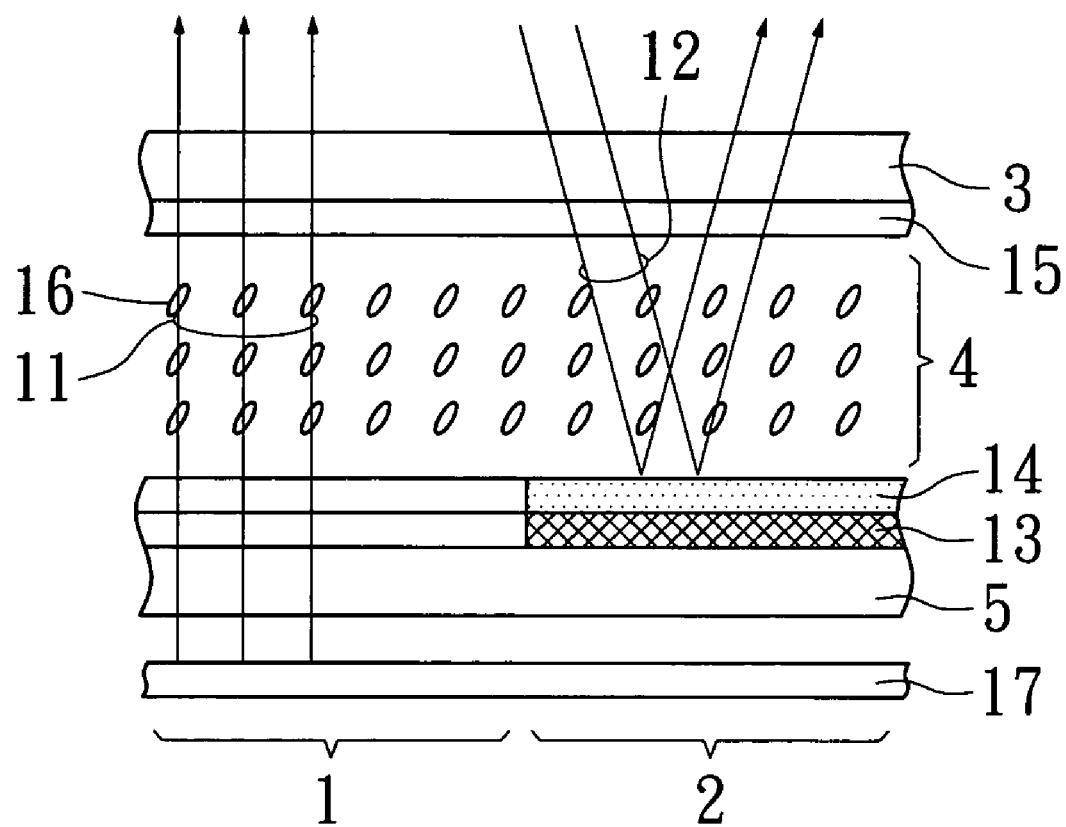
FIG. 1A (related art) is a cross-sectional view of a single pixel of a conventional transflective LCD.
Figure 1B:
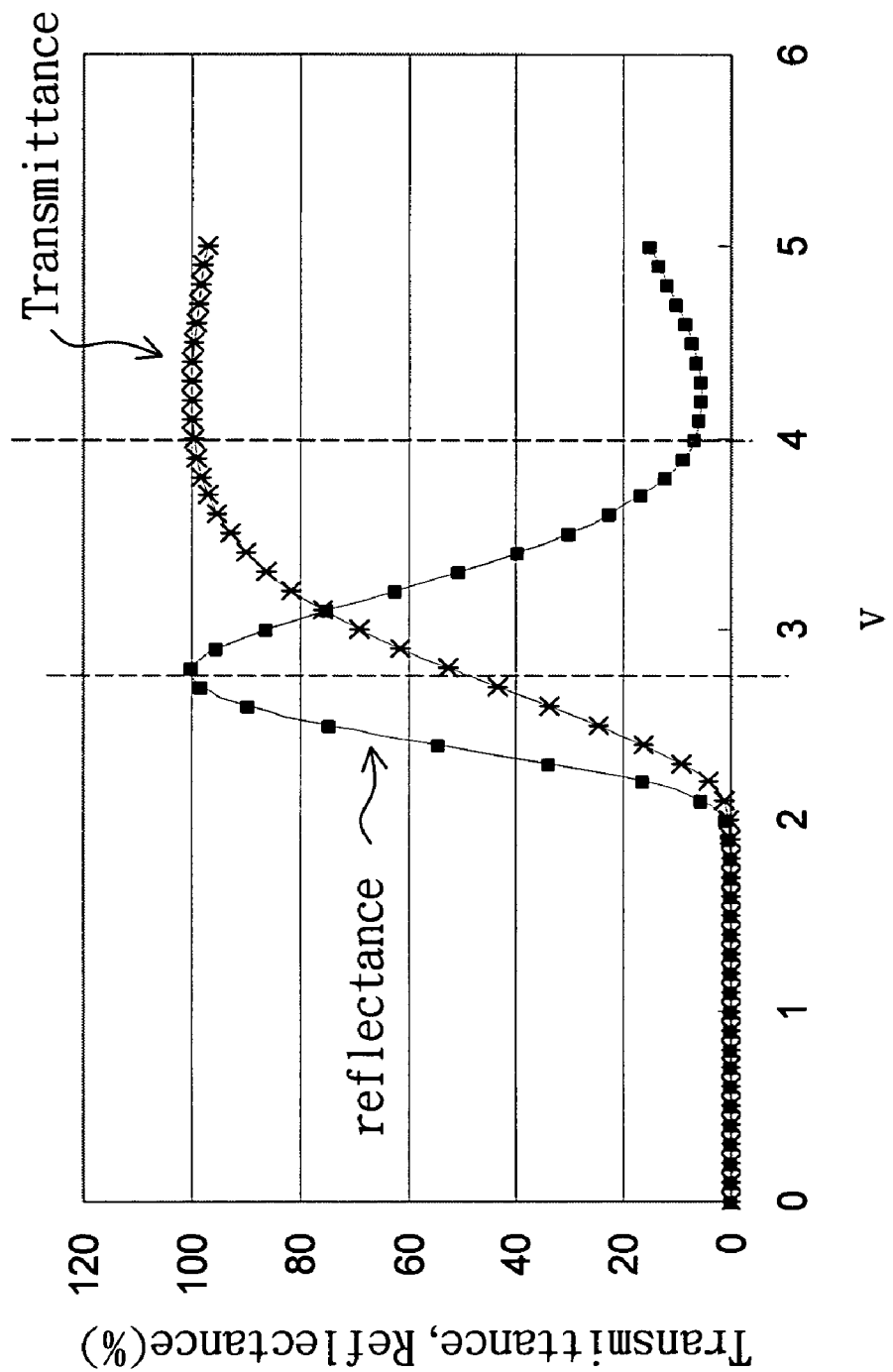
FIG. 1B (related art) is a graph illustrating the transmittance in the transmissive region and the reflectance in the reflective region when a voltage is applied to the LCD of FIG. 1A.
Figure 2:
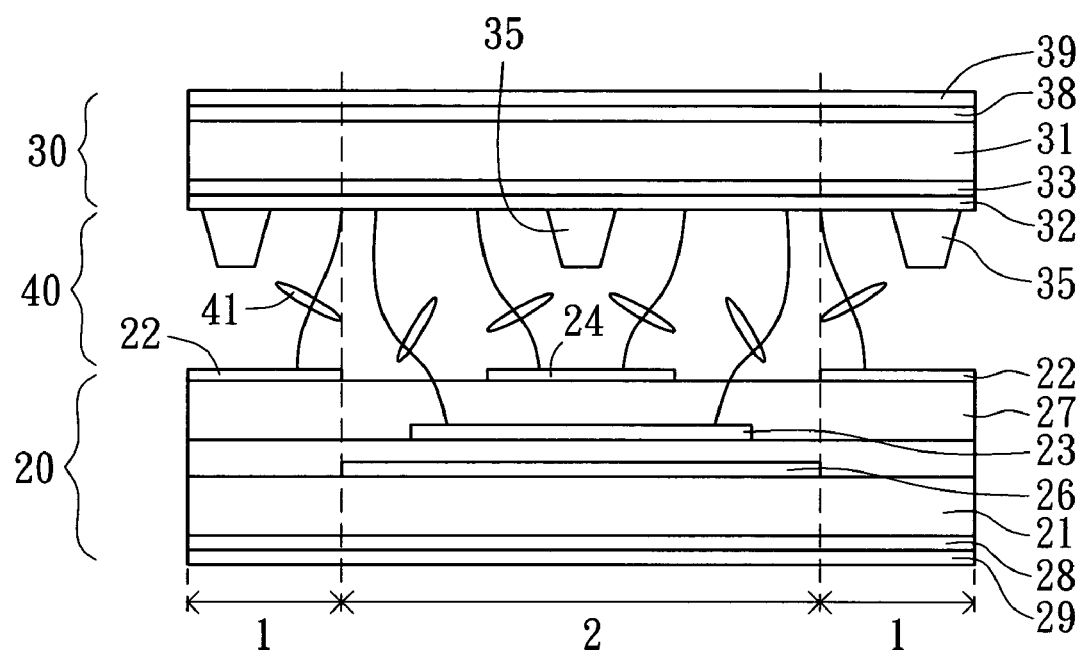
FIG. 2 is a cross-sectional view of a single pixel of a transflective LCD according to the first embodiment of the present invention.

FIG. 2 is a cross-sectional view of a single pixel of a transflective LCD according to the first embodiment of the present invention. The transflective LCD is assembled by a lower structure 20, an upper structure 30 and a liquid crystal (LC) layer 40. The LC layer 40 includes numerous LC molecules 41. The lower structure 20 comprises a lower substrate 21, several scan lines (SLs), data lines (DLs) and thin film transistors (TFTs) (SLs, DLs and TFTs not shown in FIG. 2). The scan lines are formed in one direction, and the data lines are perpendicular to the scan lines. A pixel is defined by two adjacent scan lines and data lines. Each pixel is electrically controlled by a TFT.

The pixel illustrated in FIG. 2 can be divided into the transmissive region 1 and the reflective region 2 according to the light paths. In the lower structure 20, a first transparent electrode 22, a reflective electrode 23 and a second transparent electrode 24 are formed above the lower substrate 21. Also, the first transparent electrode 22 is positioned in the transmissive region 1, while the reflective electrode 23 and the second transparent electrode 24 are disposed within the reflective region 2. Also, the second transparent electrode 24 is formed above the reflective electrode 23, and the area of the second transparent electrode 24 is smaller than that of the reflective electrode 23. Preferably, the area of the second transparent electrode 24 is no larger than half area of the reflective electrode 23. For example, the areas of the second transparent electrode 24 and the reflective electrode 23 are in the ratio of 3 to 7. Moreover, a conductive material such as ITO (indium tin oxide) can be used for making the first transparent electrode 22 and the second transparent electrode 24.

Additionally, there is a common electrode 26 disposed between the reflective electrode 23 and the lower substrate 21, functioning as a storage capacitor. The reflective electrode 23 is further covered by a dielectric layer 27 for increasing the optical efficiency. Example of the dielectric constant of the dielectric layer is less than or equal to 5. When a voltage is applied to the pixel, the electric field in the reflective region 2 is smaller than that in the transmissive region 1. Also, the upper structure 30 comprises an upper substrate 31, a common electrode 32 a color filter 33 and a protrusion 35. The position of the common electrode 32 is corresponding to the positions of the first transparent electrode 22 and the reflective electrode 23. The protrusion 35 is positioned opposite to the second transparent electrode 24.

Moreover, a first quarter wave plate 28 and a first polarizer 29 are formed on the other side of the lower substrate 21, while a second quarter wave plate 38 and a second polarizer 39 are formed on the other side of the upper substrate 31.

Accordingly, the arrangement of the second transparent electrode 24 above the reflective electrode 23 (both of them separated from each other by the dielectric layer 27) causes the difference of electric-field intensity in the reflective region 2 when a voltage is applied. The space above the second transparent electrode 24 has greater electric-field intensity than the other space of the reflective region 2. Accordingly, the difference of electric-field intensity causes the different tilt angles of the LC molecules 41 in the reflective region 2, so as to harmonize the V-R curve and the V-T curve, and particularly to improve the reflectance corresponding to the low gray-level value.

The pixel of the transflective LCD according to the first embodiment of the present invention has been analyzed and simulated. The results of simulation are presented in FIG. 3 and FIG. 4.

Figure 3:
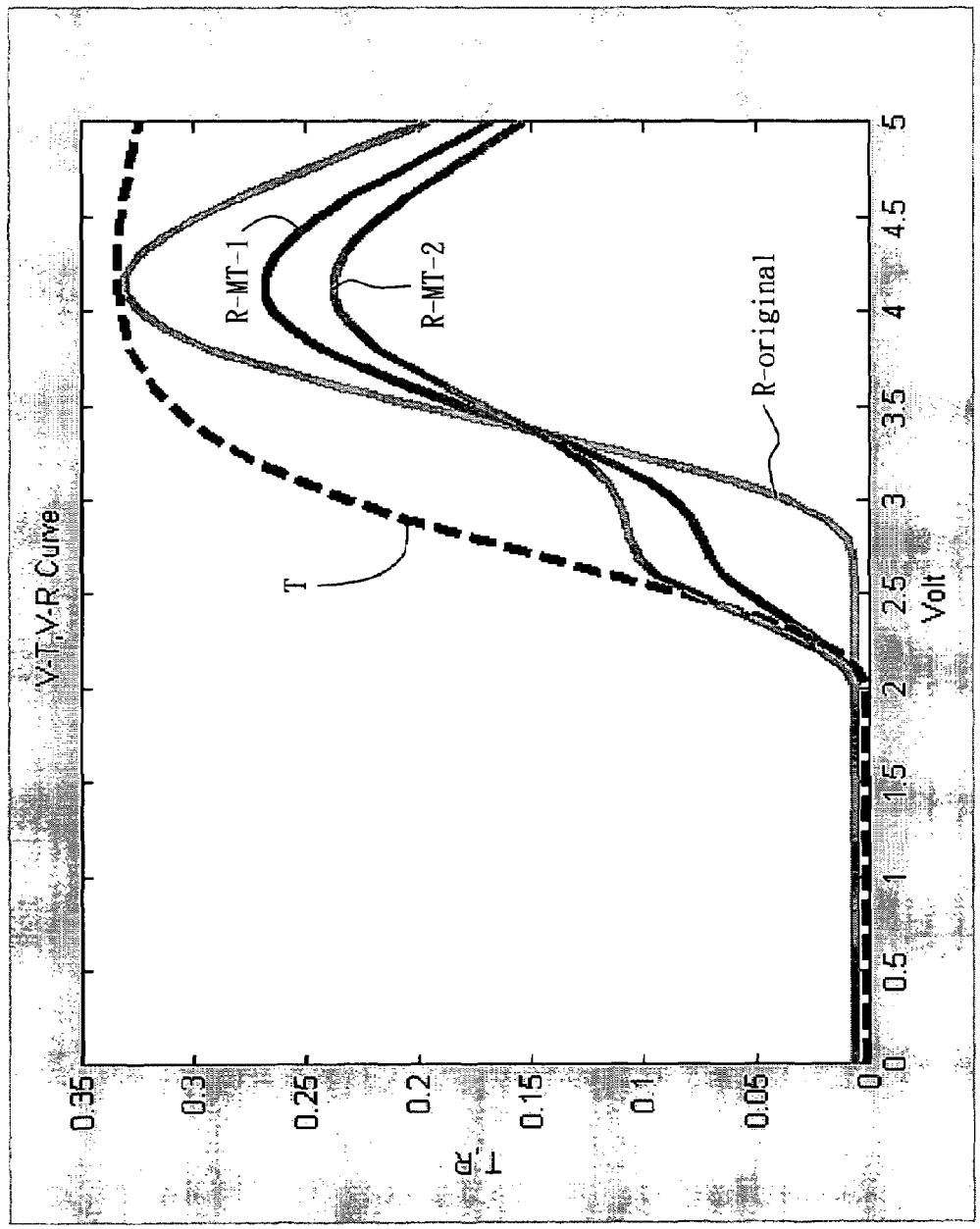
FIG. 3 is a graph illustrating the reflectance in the reflective region according to the first embodiment of the present invention.

FIG. 3 is a graph illustrating the reflectance in the reflective region according to the first embodiment of the present invention. The curves of FIG. 3 are denoted as follows:

curve T—the ideal transmittance curve in the transmissive region 1;

curve R-Original—the reflectance curve in the reflective region without the presence of the second transparent electrode 24;

curve R-MT-1—the reflectance curve in the reflective region with the presence of the second transparent electrode 24 and the reflective electrode 23 in the area ratio of 2 to 8; and curve R-MT-2—the reflectance curve in the reflective region with the presence of the second transparent electrode 24 and the reflective electrode 23 in the area ratio of 3 to 7.

As indicated by the curve R-Original (i.e. in the absence of the second transparent electrode 24) of FIG. 3, there is no change of reflectance until the applied voltage is about 2.8 V. However, the curve T starts to change at the applied voltage of about 2 V. By using the electrode structure of the first embodiment (i.e. with second transparent electrode 24), both the curve R-MT-1 and the curve R-MT-2 starts to change at the applied voltage of about 2 V, too. Accordingly, the performance of the curve R-MT-1 and the curve R-MT-2 are close to that of the ideal curve T at the low gray-level value.

Figure 4:
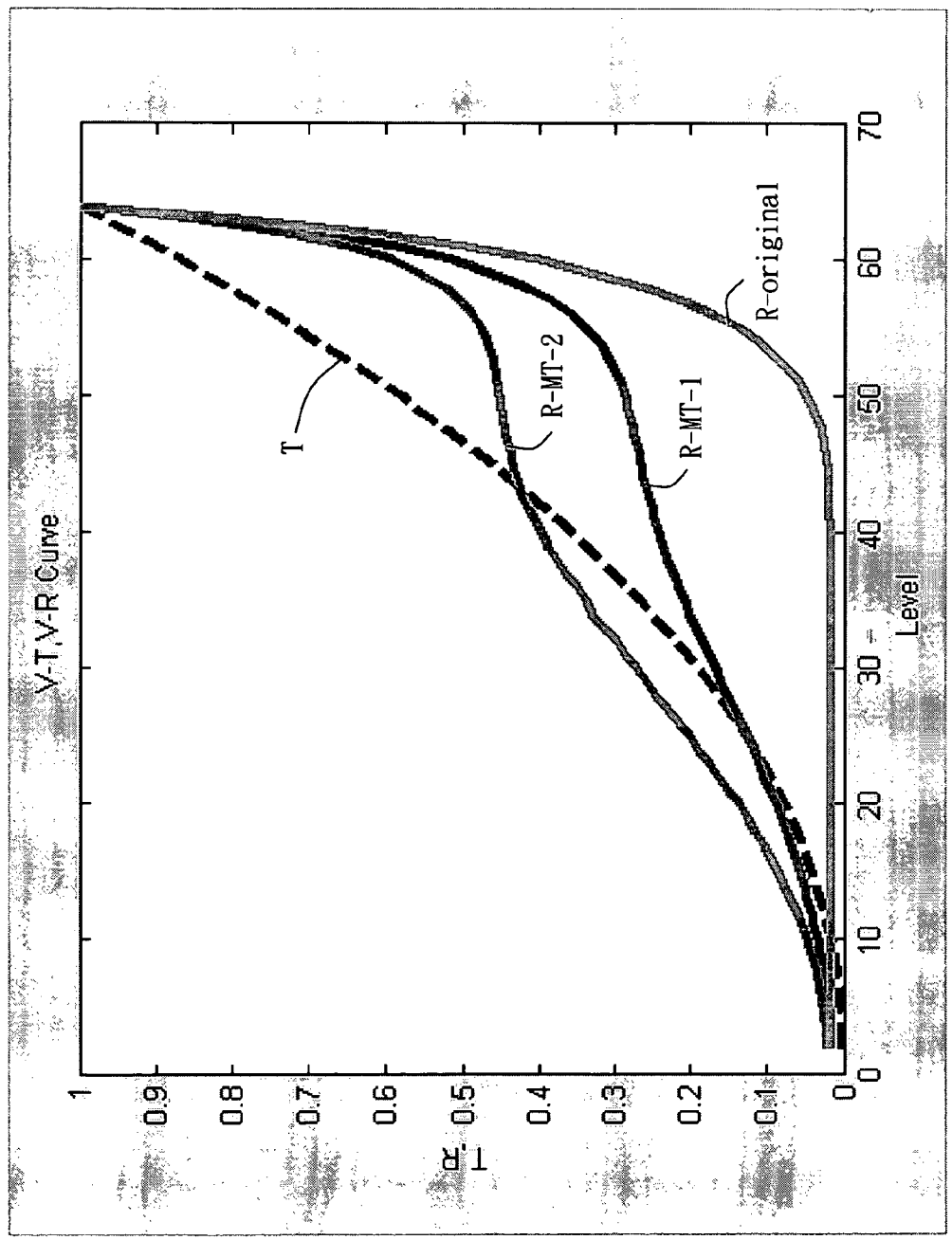
FIG. 4 is a graph illustrating the gamma curves in the pixel according to the first embodiment of the present invention.

FIG. 4 is a graph illustrating the gamma curves in the pixel according to the first embodiment of the present invention. The curves of FIG. 4 are denoted as follows:

curve T—the ideal gamma curve in the transmissive region 1;

curve R-Original—the gamma curve in the reflective region without the presence of the second transparent electrode 24;

curve R-MT-1—the gamma curve in the reflective region with the presence of the second transparent electrode 24 and the reflective electrode 23 in the area ratio of 2 to 8; and curve R-MT-2—the gamma curve in the reflective region with the presence of the second transparent electrode 24 and the reflective electrode 23 in the area ratio of 3 to 7.

The result of FIG. 4 has indicated that the curve R-Original (i.e. in the absence of the second transparent electrode 24) has a most dissimilar tendency from the ideal curve T. Both the curve R-MT-1 and the curve R-MT-2 (i.e. with second transparent electrode 24) are closer to the ideal curve T, particularly at the stage of low gray-level values. For example, the reflectance of the curve R-Original has no change at the first 50 gray levels, while the reflectance of the curve R-MT-1 and the curve R-MT-2 are varied at the first 10 gray levels. Accordingly, the gamma curve of the reflective region of the embodiment (i.e. curve R-MT-1 and the curve R-MT-2) is closer to that of the transmissive region.

According to the description above, using the electrode structure of the embodiment does improve the reflectance in the reflective region, and harmonize the performances of the reflective and transmissive the regions, particularly at the stage of low gray-level values.

Second Embodiment

Figure 5:
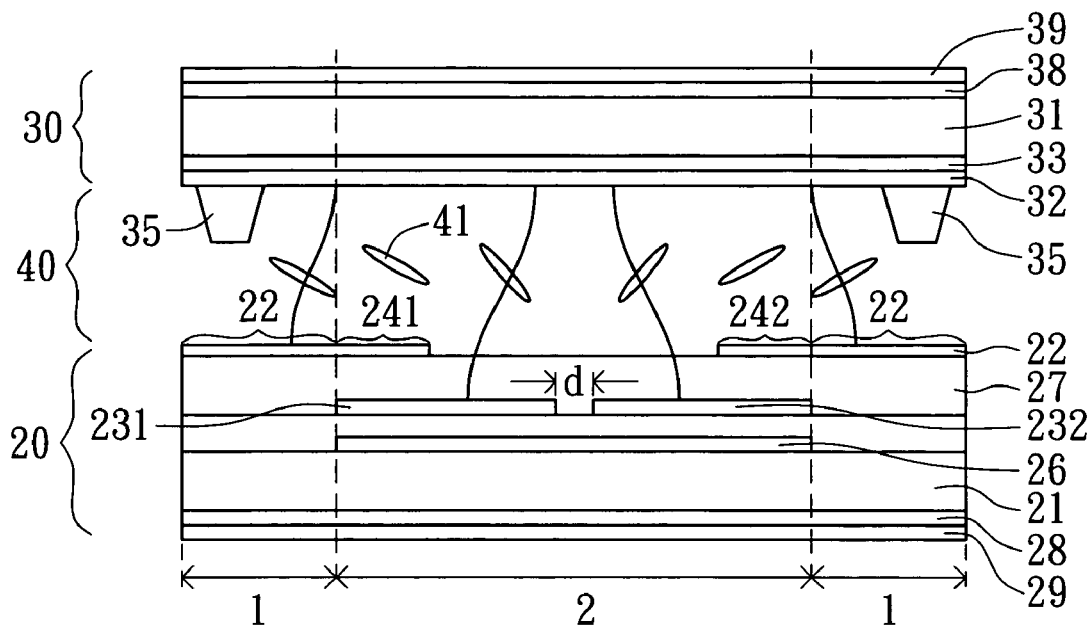
FIG. 5 is a cross-sectional view of a single pixel of a transflective LCD according to the second embodiment of the present invention.

FIG. 5 is a cross-sectional view of a single pixel of a transflective LCD according to the second embodiment of the present invention. The major difference between the first and second embodiments is that two reflective electrodes are introduced in the reflective region of the second embodiment. Additionally, the same elements of FIG. 2 and FIG. 5 are given the same reference numbers.

As shown in FIG. 5, the transflective LCD is assembled by the lower structure 20, the upper structure 30 and the liquid crystal (LC) layer 40. The LC layer 40 includes numerous LC molecules 41. The pixel is divided into the transmissive region 1 and the reflective region 2 according to the light paths. The first transparent electrode 22 is formed above the lower substrate 21 within the transmissive region 1. A second transparent electrode and a reflective electrode are disposed within the reflective region 2, wherein the second transparent electrode is formed above the reflective electrode, and the area of the second transparent electrode is smaller than that of the reflective electrode.

In the second embodiment, the reflective electrode includes a first reflective portion 231 and a second reflective portion 232; both of them are electrically connected. The second transparent electrode includes a first transparent portion 241 and a second transparent portion 242 disposed above the first reflective portion 231 and the second reflective portion 232, respectively.

A conductive material such as ITO (indium tin oxide) can be used for making the first transparent electrode 22 and the second transparent electrode (including the first transparent portion 241 and the second transparent portion 242). Moreover, the reflective electrode is further covered by a dielectric layer 27 for increasing the optical efficiency. When a voltage is applied to the pixel, the electric-field intensity in the reflective region 2 is smaller than that in the transmissive region 1. Also, the first quarter wave plate 28 and the first polarizer 29 are formed on the other side of the lower substrate 21. Also, the upper structure 30 further comprises a upper substrate 31, a common electrode 32 a color filter 33, a protrusion 35, a second quarter wave plate 38 and a second polarizer 39.

Preferably, the first transparent portion 241 and the first transparent electrode 22 are integrated as one piece; similarly, the second transparent portion 242 and the first transparent electrode 22 are integrated as one piece in the second embodiment. In the practical application, parts of the first transparent electrode 22 extended into the reflective region 2 can be referred to the first transparent portion 241 and the second transparent portion 242. Accordingly, the arrangement of the second transparent electrode (including the first transparent portion 241 and the second transparent portion 242) causes the difference of electric-field intensity in the reflective region 2 when a voltage is applied. The difference of electric-field intensity causes the different tilt angles of the LC molecules 41 in the reflective region 2, so as to compensate the optical retardation between the transmissive region 1 and the reflective region 2. Thus, the V-R curve and the V-T curve are harmonized by creating different electric-field intensity in the reflective region 2. Also, the reflectance corresponding to the low gray-level values is effectively improved.

Third Embodiment

Figure 6:
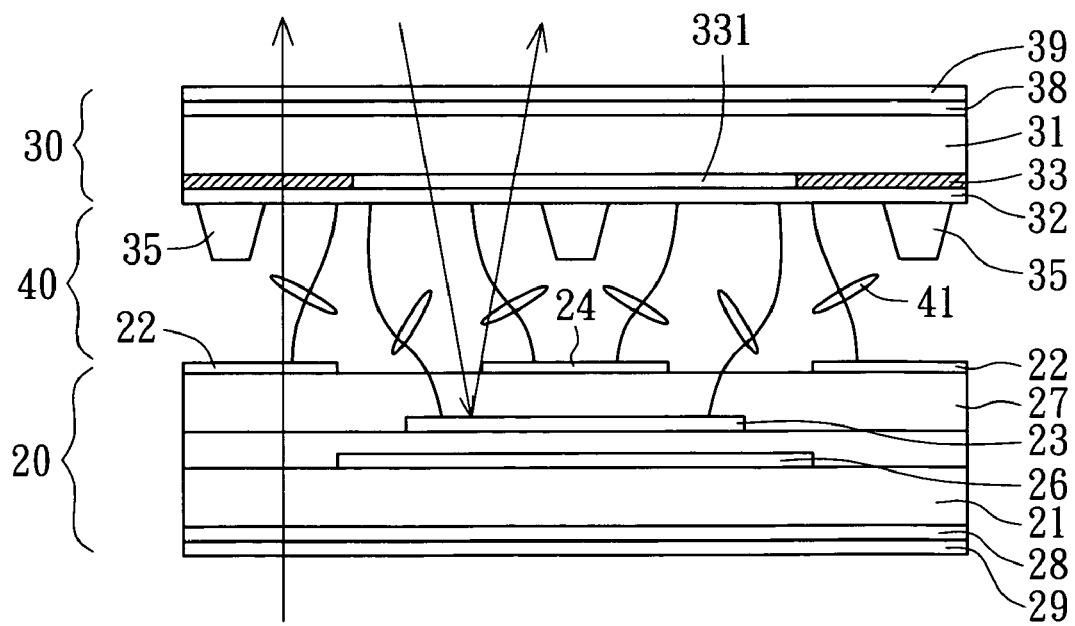
FIG. 6 is a cross-sectional view of a single pixel of a transflective LCD according to the third embodiment of the present invention.

FIG. 6 is a cross-sectional view of a single pixel of a transflective LCD according to the third embodiment of the present invention. The same elements of FIG. 2 and FIG. 6 are given the same reference numbers.

The major difference between the first and third embodiments is that no color filter exists in the reflective region 2 of the third embodiment. As shown in FIG. 6, there is a colorless portion 331 of the color filter 33 corresponding to the reflective electrode 23, and the area of the colorless portion 331 is substantially equal to that of the common electrode 26. The transmittance (T) of light is increased without the color filter (e.g. $T_{with\ CF}=0.3\times T_{without\ CF}$). In the reflective region, the reflectance is very small while the reflective light passes through the color filter twice. Accordingly, the reflectance of the reflective region does increase by removing part of the color filter 33 (e.g. equal to the colorless portion 331) in the reflective region 2, or substituting a transparent dielectric (e.g. equal to the colorless portion 331) for the color filter in the reflective region 2. The simulation results have also indicated that the pixel structure of the third embodiment does improve the reflectance in the reflective region, and harmonize the performances of the reflective and transmissive the regions, particularly at the stage of low gray-level values.

Fourth Embodiment

Figure 7:
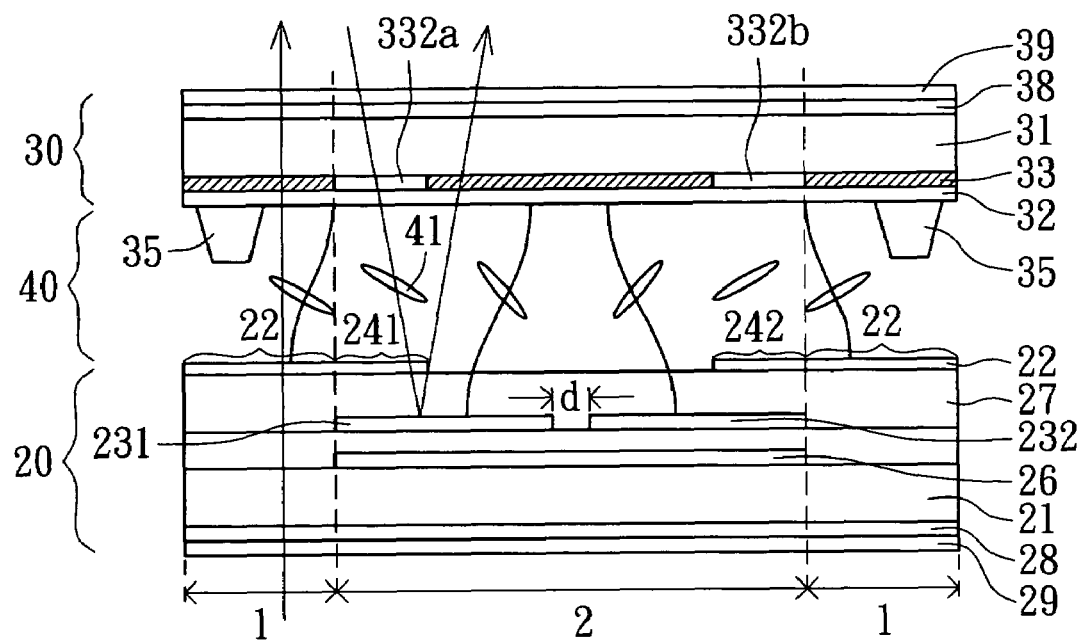
FIG. 7 is a cross-sectional view of a single pixel of a transflective LCD according to the fourth embodiment of the present invention.

FIG. 7 is a cross-sectional view of a single pixel of a transflective LCD according to the fourth embodiment of the present invention. The same elements of FIG. 5 and FIG. 7 are given the same reference numbers.

In the single pixel of the fourth embodiment, the portions of the color filter 33 corresponding to the position of the second transparent electrode (i.e. the first transparent portion 241 and the second transparent portion 242) are removed. As shown in FIG. 7, the color filter 33 has the colorless portions 332a and 332b. The simulation results have also indicated that the pixel structure of the fourth embodiment does improve the reflectance in the reflective region, and harmonize the performances of the reflective and transmissive the regions, particularly at the stage of low gray-level values. Moreover, compared to the pixel structure of the third embodiment, the pixel structure of the fourth embodiment possesses better color saturation (i.e., less area of color filter being removed in the fourth embodiment). Thus, the pixel structure of the fourth embodiment presents not only high brightness at the low gray level but also good color saturation at the high gray level.

Fifth Embodiment

Figure 8:
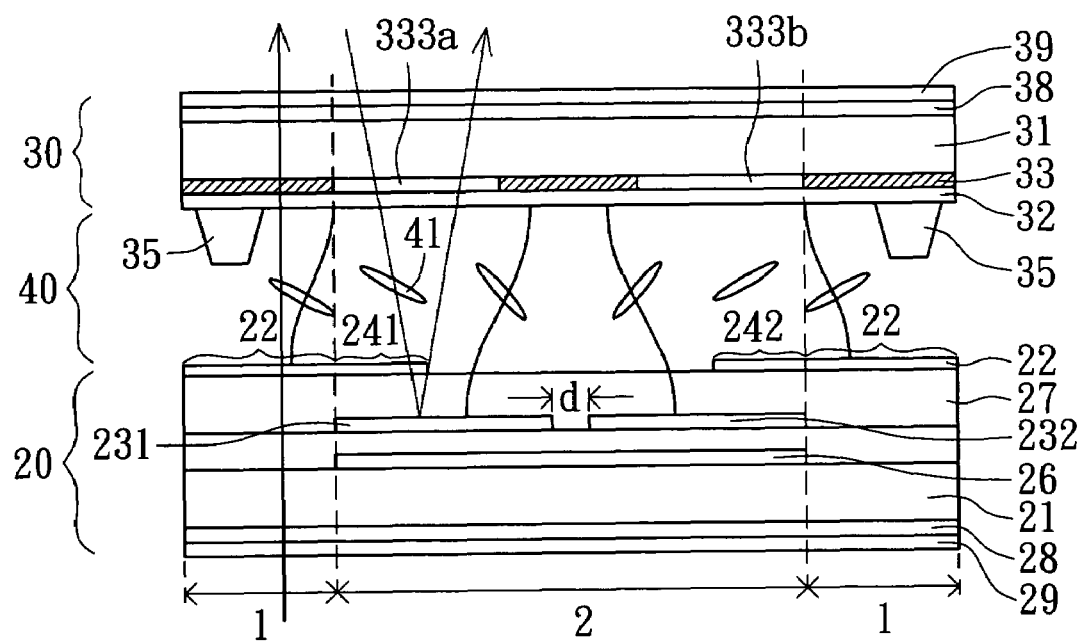
FIG. 8 is a cross-sectional view of a single pixel of a transflective LCD according to the fifth embodiment of the present invention.

FIG. 8 is a cross-sectional view of a single pixel of a transflective LCD according to the fifth embodiment of the present invention. The same elements of FIG. 5 and FIG. 8 are given the same reference numbers.

In the single pixel of the fifth embodiment, the large portions of the color filter 33 related to the second transparent electrode (i.e. the first transparent portion 241 and the second transparent portion 242) are removed. As shown in FIG. 8, the color filter 33 has the colorless portions 333a and 333b. The simulation results have also indicated that the pixel structure of the fifth embodiment does improve the reflectance in the reflective region, and harmonize the performances of the reflective and transmissive the regions, particularly at the stage of low gray-level values. Moreover, compared to the pixel structure of the third embodiment, the pixel structure of the fifth embodiment possesses better color saturation (i.e., less areas of color filter being removed in the fourth embodiment). Thus, the pixel structure of the fifth embodiment presents not only high brightness at the low gray level but also good color saturation at the high gray level.

Sixth Embodiment

Figure 9:
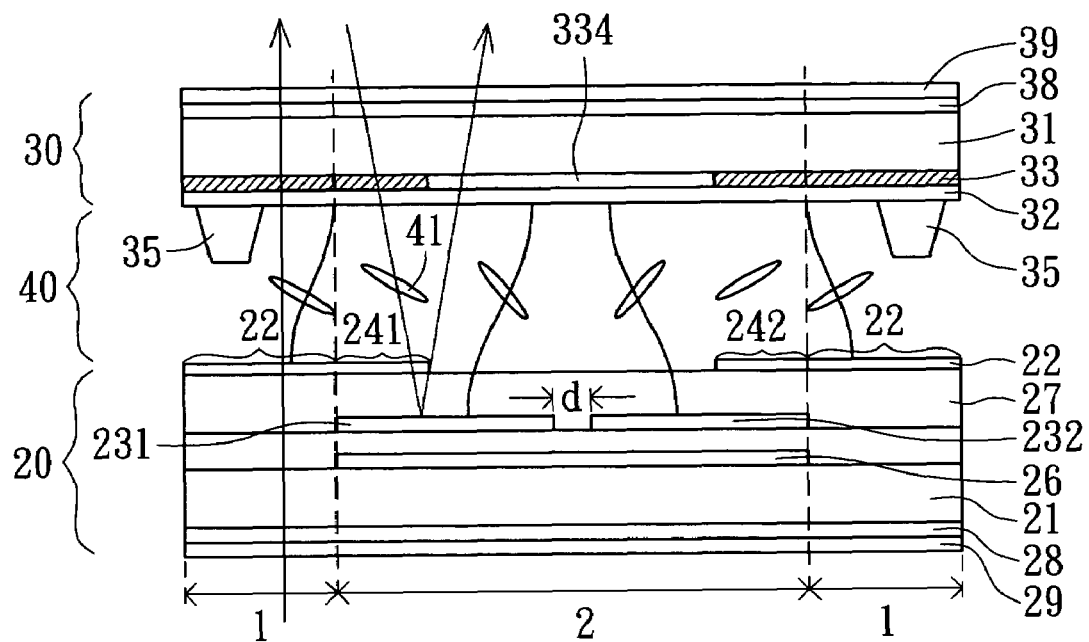
FIG. 9 is a cross-sectional view of a single pixel of a transflective LCD according to the sixth embodiment of the present invention.

FIG. 9 is a cross-sectional view of a single pixel of a transflective LCD according to the sixth embodiment of the present invention. The same elements of FIG. 5 and FIG. 9 are given the same reference numbers.

In the single pixel of the sixth embodiment, the portions of the color filter 33 corresponding to the second transparent electrode (i.e. the first transparent portion 241 and the second transparent portion 242) remain, and others are removed. As shown in FIG. 9, the color filter 33 has the colorless portion 334. The simulation results have also indicated that the pixel structure of the sixth embodiment does improve the reflectance in the reflective region, and harmonize the performances of the reflective and transmissive the regions, particularly at the stage of low gray-level values. Moreover, compared to the pixel structure of the third embodiment, the pixel structure of the sixth embodiment presents not only high brightness at the low gray level but also good color saturation at the high gray level.

Seventh Embodiment

Figure 10:
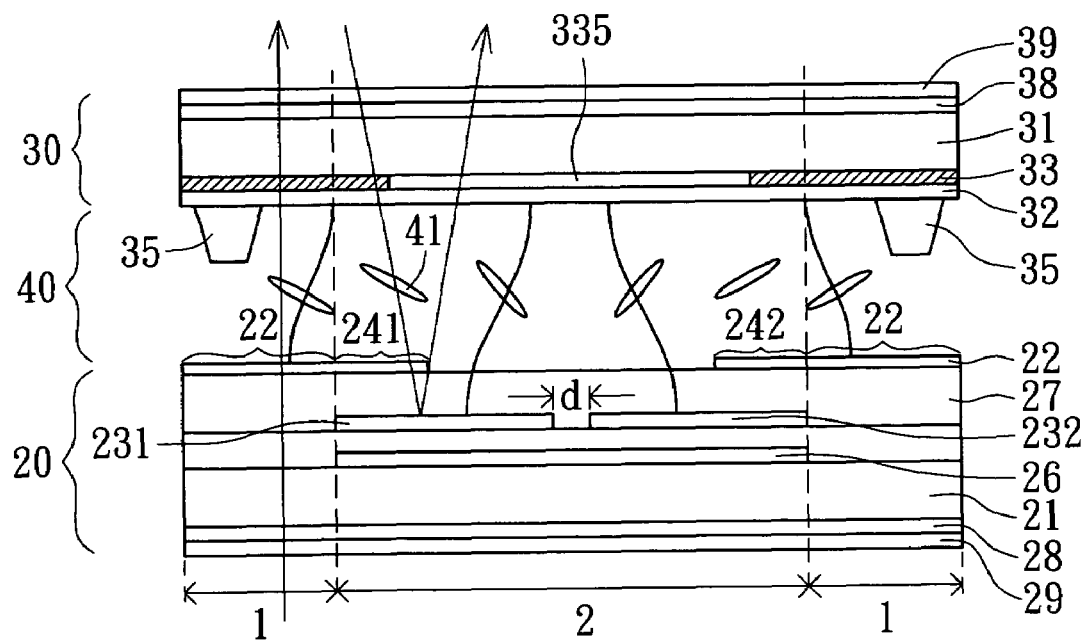
FIG. 10 is a cross-sectional view of a single pixel of a transflective LCD according to the seventh embodiment of the present invention.

FIG. 10 is a cross-sectional view of a single pixel of a transflective LCD according to the seventh embodiment of the present invention. The same elements of FIG. 5 and FIG. 10 are given the same reference numbers.

In the single pixel of the seventh embodiment, the small portions of the color filter 33 relative to the second transparent electrode (i.e. the first transparent portion 241 and the second transparent portion 242) remain, and others are removed. As shown in FIG. 10, the color filter 33 has the colorless portion 335. The simulation results have also indicated that the pixel structure of the seventh embodiment does improve the reflectance in the reflective region, and harmonize the performances of the reflective and transmissive the regions, particularly at the stage of low gray-level values. Moreover, compared to the pixel structure of the third embodiment, the pixel structure of the seventh embodiment presents not only high brightness at the low gray level but also good color saturation at the high gray level.

Eighth Embodiment

Figure 11A:
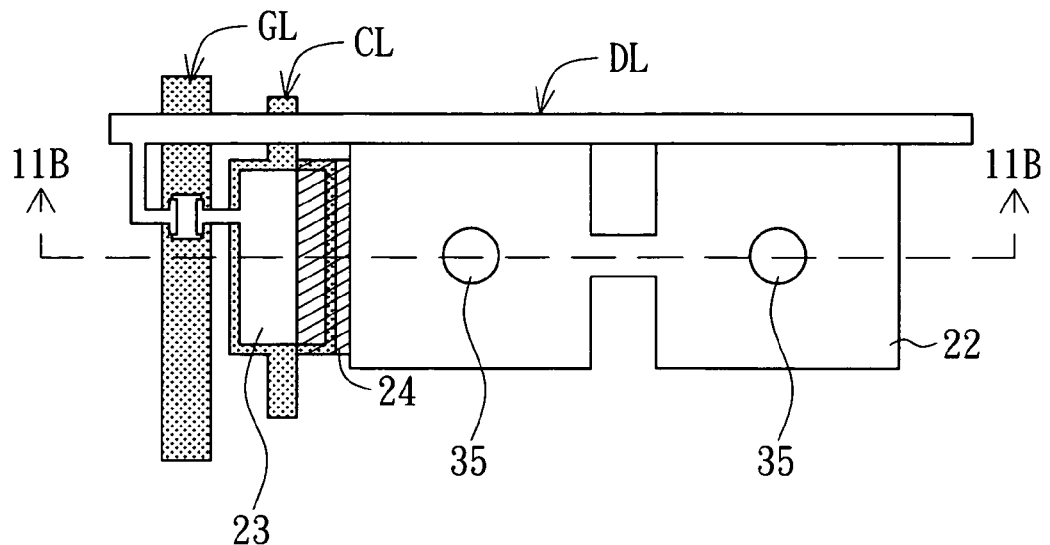
FIG. 11A is a top view of a single pixel of a transflective LCD according to the eighth embodiment of the present invention.
Figure 11B:
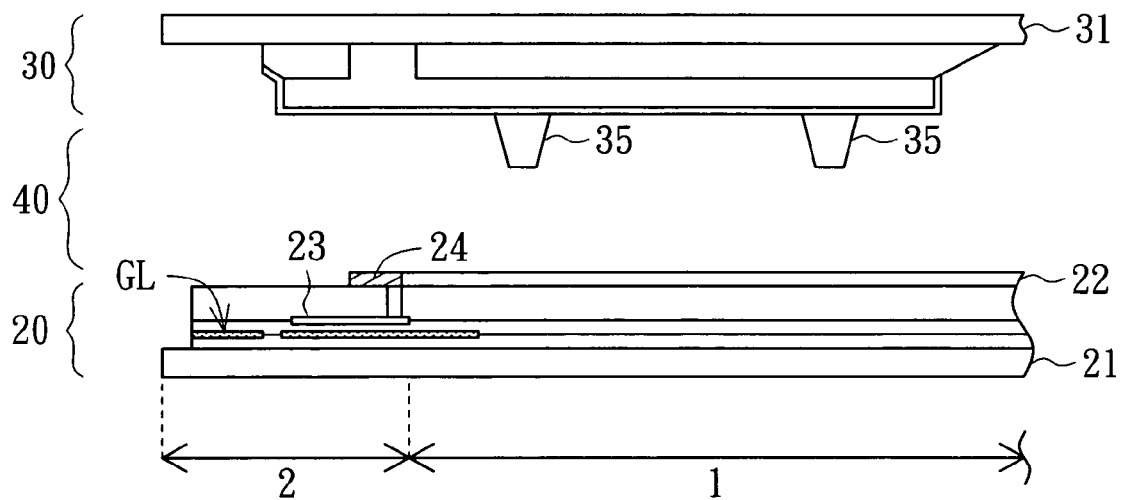
FIG. 11B is a cross-sectional view of the single pixel along the cross-sectional line 11B-11B of FIG. 11A.

FIG. 11A is a top view of a single pixel of a transflective LCD according to the eighth embodiment of the present invention. FIG. 11B is a cross-sectional view of the single pixel along the cross-sectional line 11B-11B of FIG. 11A. The same elements of FIG. 2, FIG. 11A and FIG. 11B are given the same reference numbers. Also, GL, CL and DL denoted in FIG. 11A and FIG. 11B are the abbreviations of gate line, common line and data line, respectively.

As shown in FIG. 11A and FIG. 11B, the transflective LCD is assembled by the lower structure 20, the upper structure 30 and the liquid crystal (LC) layer 40. The pixel is divided into the transmissive region 1 and the reflective region 2. The first transparent electrode 22 is formed above the lower substrate 21 within the transmissive region 1. The second transparent electrode 24 and the reflective electrode 23 are disposed within the reflective region 2, wherein the second transparent electrode 24 is formed above the reflective electrode 23, and the area of the second transparent electrode 24 is smaller than that of the reflective electrode 23. Also, the protrusion 35 positioned on the upper substrate 31 is opposite to the first transparent electrode 22.

The arrangement of the second transparent electrode 24 does cause the difference of electric-field intensity in the reflective region 2 when a voltage is applied. The difference of electric-field intensity causes the different tilt angles of the LC molecules in the reflective region 2, so as to compensate the optical retardation between the transmissive region 1 and the reflective region 2. Also, the reflectance corresponding to the low gray-level values is effectively improved.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The invention claimed is:

1. An electrode structure for use in a transflective liquid crystal display device having a plurality of pixels, each pixel having a reflective region and a transmissive region, the electrode structure comprising:
   a first transparent electrode formed within the transmissive region;
   a reflective electrode formed within the reflective region; and
   a second transparent electrode formed within the reflective region and above the reflective electrode, wherein an area of the second transparent electrode is smaller than an area of the reflective electrode,
   wherein the reflective electrode includes a first reflective portion and a second reflective portion, and the first reflective portion and the second reflective portion are separated from each other by a distance.

2. The electrode structure of claim 1, wherein the area of the second transparent electrode is less than half area of the reflective electrode.

3. The electrode structure of claim 1, wherein the second transparent electrode includes a first transparent portion and a second transparent portion disposed above the first reflective portion and the second reflective portion, respectively.

4. The electrode structure of claim 3, wherein the first transparent portion and the first transparent electrode are integrated as one piece.

5. The electrode structure of claim 3, wherein the second transparent portion and the first transparent electrode are integrated as one piece.

6. The electrode structure of claim 1, wherein at least one of the first transparent electrode and the second transparent electrode comprises an indium tin oxide (ITO).

7. The electrode structure of claim 1, further comprising a dielectric layer disposed between the reflective electrode and the second transparent electrode.

8. A transflective liquid crystal display (LCD) device, comprising:
   a lower structure, comprising:
      a lower substrate; and
      a plurality of scan lines and data lines, wherein
         the data lines are perpendicular to the scan lines for defining a plurality of pixels,
         each pixel is electrically controlled by a TFT and defined by two adjacent scan lines and data lines, and
         each pixel comprises:
            a transmissive region having a first transparent electrode; and
            a reflective region having a reflective electrode and a second transparent electrode, wherein the second transparent electrode is formed above the reflective electrode, and an area of the second transparent electrode is smaller than an area of the reflective electrode; and
   an upper structure, comprising:
      a upper substrate;
      a common electrode formed on the upper substrate and positioned opposite to the first transparent electrode and the reflective electrode; and
      a liquid crystal layer including a plurality of liquid crystal molecules and positioned between the lower structure and the upper structure;
   wherein the reflective electrode includes a first reflective portion and a second reflective portion, and the first reflective portion and the second reflective portion are separated from each other by a distance.

9. The transflective LCD device of claim 8, further comprising a dielectric layer disposed between the reflective electrode and the second transparent electrode.

10. The transflective LCD device of claim 9, wherein the dielectric layer has a dielectric constant less than or equal to 5.

11. The transflective LCD device of claim 8, wherein the area of the second transparent electrode is less than half area of the reflective electrode.

12. The transflective LCD device of claim 8, further comprising a protrusion formed on the upper substrate and opposite to the second transparent electrode.

13. The transflective LCD device of claim 8, wherein the second transparent electrode includes a first transparent portion and a second transparent portion disposed above the first reflective portion and the second reflective portion, respectively.

14. The transflective LCD device of claim 13, wherein the first transparent portion and the first transparent electrode are integrated as one piece.

15. The transflective LCD device of claim 13, wherein the second transparent portion and the first transparent electrode are integrated as one piece.

16. The transflective LCD device of claim 8, wherein at least one of the first transparent electrode and the second transparent electrode comprises an indium tin oxide (ITO).

17. The transflective LCD device of claim 8, further comprising a color filter disposed between the upper substrate and the common electrode.

18. The transflective LCD device of claim 17, wherein the color filter has a colorless portion corresponding to the reflective electrode.

19. The transflective LCD device of claim 18, wherein an area of the colorless portion is substantially equal to an area of the second transparent electrode.

20. The transflective LCD device of claim 18, wherein an area of the colorless portion is substantially equal to an area of the reflective electrode.

21. The transflective LCD device of claim 18, wherein the colorless portion of the color filter is substantially thinner than other portions of the color filter.

* * * * *

UNITED STATES PATENT AND TRADEMARK OFFICE
CERTIFICATE OF CORRECTION

PATENT NO. : 7,656,481 B2　　　　　　　　　　　　　　　　　　　　　　　　　　Page 1 of 1
APPLICATION NO. : 11/473019
DATED : February 2, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this

Thirtieth Day of November, 2010

David J. Kappos
*Director of the United States Patent and Trademark Office*